United States Patent [19]

Suerbaum

[11] 3,829,931
[45] Aug. 20, 1974

[54] MACHINE FOR RECOVERING MEAT
[75] Inventor: Eberhard Suerbaum, Rhine, Germany
[73] Assignee: Nordischer Maschinenbau Rud. Baader, Lubeck, Germany
[22] Filed: May 15, 1972
[21] Appl. No.: 253,018

[52] U.S. Cl. .................................. 17/1 G, 17/46
[51] Int. Cl. ........................................... A22b
[58] Field of Search ....................... 17/1 G, 46

[56] References Cited
UNITED STATES PATENTS
| | | | |
|---|---|---|---|
| 3,266,542 | 8/1966 | Paoli | 17/1 G X |
| 3,396,768 | 8/1968 | Kurihara | 17/1 G X |
| 3,507,387 | 4/1970 | Alldred et al. | 17/1 G X |

*Primary Examiner*—Robert Peshock
*Assistant Examiner*—D. L. Weinhold
*Attorney, Agent, or Firm*—Edward F. Levy

[57] ABSTRACT

In a machine for recovering meat attached to parts like bones, skin, sinews, etc., severed from animals by press separating the meat from these parts including a rotatably journalled perforated drum, a flexible endless pressure belt passing around part of the circumference of the drum with the material to be processed received between the belt and the drum, a pressure roll driving and biasing the belt against the drum, and a detaining and backing roll for the belt disposed upstream of the pressure roll and serving to evenly distribute the material over the width of the belt the invention resides in that pressure belt biasing means are provided disposed in both marginal zones of the pressure belt upstream of the pressure roll serving to prevent bulging and to retain the marginal zones of the belt immediately upstream of the pressure roll in contacting engagement with the drum, thereby preventing lateral escape of the processed material.

5 Claims, 3 Drawing Figures

MACHINE FOR RECOVERING MEAT

BACKGROUND OF THE INVENTION

In machines for recovering high quality meat still clinging to parts that have been severed from the bodies of animals, e.g., fishes, in prior operations including a rotatably journalled perforated drum, a flexible endless pressure belt passing around part of the circumference of the drum with the material to be processed received between the belt and the drum, a pressure roll driving and biasing the belt against the drum, and a detaining and backing roll for the belt disposed upstream of the pressure roll and serving to evenly distribute the material over the width of the belt it is important that a sufficiently high static pressure is developed upstream of the return and biasing roll between the pressure belt and the perforated drum in the wedge-shaped entry portion of the material to be processed, which will force the flowable meat particles to pass the perforations of the drum, while the bones, sinews, skin etc are retained. To this end it is known to arrange one or more detaining and backing rolls upstream of the return roll pressing the belt against the perforated drum. These detaining and backing rolls will exert a certain throttle effect upon the continuously advancing material to be processed, thereby allowing more or less, a certain pressurizing of the material. However, it is not possible to prevent the formation of bulges in the flexible belt between the detaining and backing rolls and particularly so in the marginal zones of the belt. This results in a poor yield of fish meat, and besides this in a contamination of the machine below the pressure belt, which is objectionable in hygienic respect.

Therefore, it is an aim of this invention to provide an improved press separating machine of the abovementioned type enabling a high yield of fish meat by exerting a sufficiently high pressure on the material to be processed with the aid of the pressure belt.

SUMMARY OF THE INVENTION

In a machine for recovering meat by press separating it from bones, skin, sinews, etc the invention is realized by the following combination:

a. a perforated drum journalled in side walls of a machine frame;

b. an endless pressure belt trained around a plurality of rolls journalled in said side walls and guiding the pressure belt to form a loop around part of the circumference of the perforated drum thereby forming an entry gap between the belt and the drum, wherein a pressure roll at the end of the loop is biasing the belt against the circumference of the drum;

c. drive means rotating the pressure roll;

d. a detaining and backing roll for the belt arranged upstream of the pressure roll in the zone of the drum engaging loop of the belt; and e. pressure belt biasing means disposed upstream of the pressure roll including members backing both marginal zones of the belt and urging them against the drum.

The provision of the pressure belt biasing means retains the material to be processed between the belt and the drum and prevents that it is squeezed-out at the sides of the belt, since the marginal zones cannot bulge.

An advantageous embodiment of the invention provides that each member of the pressure belt biasing means includes an arcuate pressure curve extending substantially concentrically to the circumference of the drum and a spirally shaped curve gradually approaching the marginal zone of the belt.

Preferably each member of the pressure belt biasing means is formed as a double-armed lever pivotal about an axis extending in parallel relation to the axis of the drum. Advantageously one pair of the lever arms are connected by a supporting rod, at their free ends in the zone of the spirally-shaped curve, thereby assuring uniform movements of both levers. Suitably the thickness of each double-armed lever corresponds substantially to twice the thickness of the pressure belt.

In order to minimize the friction between the pressure belt and the biasing means the invention provides that the double-armed levers consist of thermoplastic material, such as high molecular polythylene.

Figure 1:
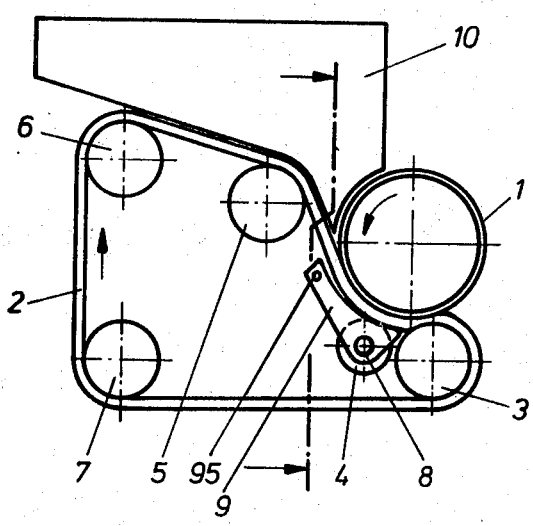
FIG. 1 is a schematical side view of a meat recovery machine according to the invention.
Figure 2:
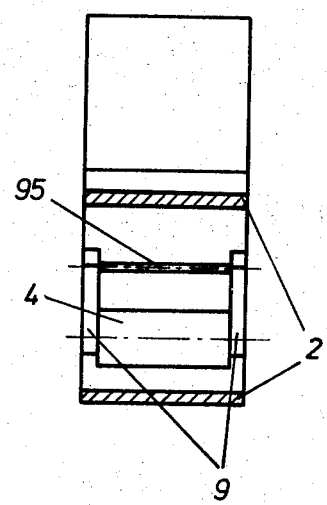
FIG. 2 is a sectional view in the plane of the section line of FIG. 1.
Figure 3:
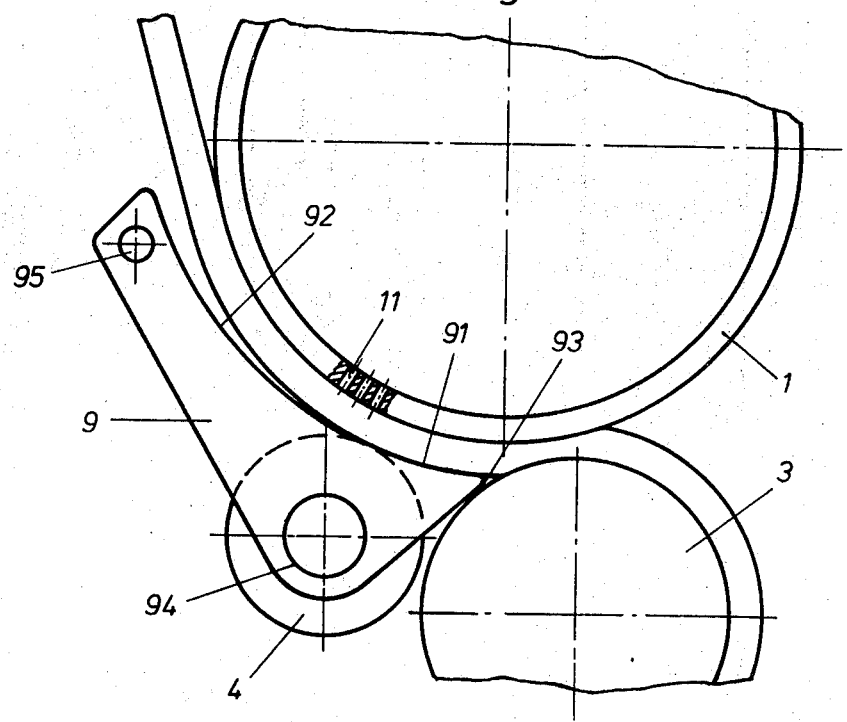
FIG. 3 is an enlarged partial view of FIG. 1.

For reasons of clarity the side walls of the machine frame, the bearings of the different members, and also the drive means including the gearing etc have been omitted.

A perforated drum 1 and a pressure roll 3 are journalled in the not illustrated side walls of the machine frame and driven in the direction indicated by the arrows, while the shafts of a detaining and backing roll 4, of guide rolls 5 and 7, and of a tightening roll 6 are also journalled in the side walls, but are not driven. A pressure belt 2 is trained around the rolls 3, 4, 5, 6 and 7 and moves free of play between the side walls of the machine frame. The pressure belt 2 is flexible and is compressed to a fraction of its thickness between the perforated drum 1 and the pressure roll 3, and is simultaneously biased against the drum. The detaining and backing roll 4 is spaced a certain distance relative to the unerside of the pressure belt 2. The perforated drum 1 has a plurality of perforations 11 formed in its cylinder wall serving as passages for the fish meat.

A stationary axle 8 carries the freely rotatably detaining and backing roll 4 and between each of its end faces and the side walls a freely pivotal belt biasing lever 9, about the thickness of which the length of the detaining and backing roll 4 is shorter than the width of the pressure belt 2. Each of the biasing levers 9 has the form of a bell crank provided with a bore 94 through which the axle 8 extends, wherein the one lever arm is defined by an arcuate pressing curve 91 terminating in a point 93, while the other lever arm is defined by an entry curve 92. The lever arms of the two belt biasing levers 9 which include the entry curves 92, and which are disposed in each of the marginal zones of the pressure belt 2, are interconnected by a supporting rod 95.

MODE OF OPERATION

The material to be processed consisting of meat pieces containing bones and sinews is fed out of a hopper 10 into the entry zone between the perforated press straining drum 1, and the pressure belt 2. In this entry zone a continuous web of this material is formed on the circumference of the drum, whereby the pressure belt is lifted off simultaneously. This continuous web of material is equalized by the detaining and backing roll 4 and the pressure acting thereupon will increase between this latter roll 4 and the pressure roll 3. In this zone the pressure causes the pressure belt 2 to bulge which in turn is the cause that the marginal zones of the pressure belt 2 tend to move away from the perforated drum 1, but according to the invention this is prevented by the supporting effect of the pressing curve 91 of the belt biasing levers which extend downstream from the detaining and backing roll 4 toward the pressure roll 3. Simultaneously the entry curves 92 of the belt biasing levers 9, which extend upstream from the detaining and backing roll 4, will develop backing forces acting on the pressure belt 2, thereby preventing that the pressure belt 2 is lifted off in the zone between the detaining and backing roll 4 and the pressure roll 3. However, in case of extreme stresses ocurring in local zones caused by pieces of bones etc the belt pressing means 9 may give way by pivoting thereby excluding the danger to damage or destroy the pressure belt 2.

In order to achieve a sparing sliding movement between the pressure belt 2 and the belt biasing levers 9 also under pressure, the belt biasing levers 9 are suitably made of thermoplastic material, such as polyamid, or highly molecular polyethylene. The thickness of the belt biasing levers 9 should correspond to at least twice the thickness of the pressure belt 2. In case homogeneous material is to be processed the belt biasing levers 9 may be connected rigidly to the side walls of the machine frame.

What is claimed is:

1. A machine for recovering meat from inedible parts such as bones, skin, sinews, etc., severed from animals, by press separating the meat from these parts, said machine comprising a rotatably journalled perforated drum, a flexible endless pressure belt passing around at least a part of the circumference of said drum, thereby forming an entry gap between said belt and said drum for the feeding of meat pieces therebetween, a pressure roll in driving engagement with said belt and biasing said belt against the circumference of said drum at a point spaced from said entry gap, drive means for rotating said pressure roll in a direction to move said belt from said entry gap toward said pressure roll, a detaining and backing roll for said belt disposed upstream of said pressure roll downstream of said entry gap and serving to evenly distribute the fed meat pieces over the width of said belt before said pieces are carried to said pressure roll, and pressure belt biasing means arranged upstream of said pressure roll and including a pair of members having belt-engaging surfaces backing and bearing against only the marginal side zones of said belt in the region between said detaining and backing roll and said pressure roll, said belt-engaging surfaces being arcuate and extending substantially concentrically to the circumference of said drum, said pair of members each also having a curved surface gradually approaching said marginal zones of said drum, whereby said pressure belt biasing means retains the fed meat pieces between said belt and said drum by limiting bulging of said belt in said marginal zones and consequently avoiding squeezing-out of said meat pieces at the sides of said belt.

2. A machine as claimed in claim 1, wherein each member of said pressure belt biasing means is formed as a double-armed lever pivotal about an axis extending in parallel relation to the axis of said drum.

3. A machine as claimed in claim 1, wherein each member of said pressure belt biasing means is formed as a double-armed lever pivotal about an axis extending in parallel relation to the axis of said drum, each lever including an arcuate pressure curve extending along the one lever arm substantially concentrically to the circumference of said drum and a substantially spirally-shaped entry curve extending along the other lever arm gradually approaching the marginal zone of said belt, and wherein the free ends of one pair of lever arms are connected by a supporting rod in the zone of said entry curve.

4. A machine as claimed in claim 3, wherein the thickness of each double-armed lever is at least substantially twice the thickness of said pressure belt.

5. A machine as claimed in claim 3, wherein said double-armed levers consist of thermoplastic material, such as highly molecular polyethylene.

* * * * *